United States Patent [19]

Hudson, Jr. et al.

[11] Patent Number: 4,847,839
[45] Date of Patent: Jul. 11, 1989

[54] DIGITAL REGISTERS WITH SERIAL ACCESSED MODE CONTROL BIT

[75] Inventors: Charles L. Hudson, Jr., Plymouth; Michael L. Kalm, Spring Lake, both of Minn.

[73] Assignee: Honeywell Inc., Minneapolis, Minn.

[21] Appl. No.: 89,381

[22] Filed: Aug. 26, 1987

[51] Int. Cl.[4] ............................................. G01R 31/28
[52] U.S. Cl. ....................................................... 371/25
[58] Field of Search ................. 371/15, 25; 324/73 R, 324/73 AT

[56] References Cited

U.S. PATENT DOCUMENTS

| | | | |
|---|---|---|---|
| 4,463,450 | 8/1984 | Haeusele | 365/200 |
| 4,488,259 | 12/1984 | Mercy | 364/900 |
| 4,513,418 | 4/1985 | Bardell, Jr. et al. | 371/25 |
| 4,519,078 | 5/1985 | Komonytsky | 371/25 |
| 4,594,711 | 6/1986 | Thatte | 371/25 |
| 4,601,034 | 7/1986 | Sridhar | 371/25 |
| 4,701,916 | 10/1987 | Naven et al. | 371/15 |
| 4,703,484 | 10/1987 | Rolfe et al. | 371/25 |

OTHER PUBLICATIONS

Project Status Report VHSIC Phase 2, Contract No. F33615-84-C-1500, May 1985.
Konemann et al., Built-In Test for Complex Digital Integrated Circuits, IEEE Journal of Solid-State Circuits, vol. SC-15, No. 3, Jun. 1980, pp. 315-319.
Bhavsar, Self-Testing by Polynomial Division, Digest of Papers-1981 Intl. Test Conf., IEEE, pp. 208-216.
Fasang, Circuit Module Implements Practical Self-Testing, Electronics, vol. 88, No. 1557, May 19, 1982, pp. 164-167.

Primary Examiner—Charles E. Atkinson
Attorney, Agent, or Firm—W. T. Udseth

[57] ABSTRACT

A reconfigurable digital register that can be serially loaded has an additional bit associated with the register which holds information indicative of a mode of operation of the register. The mode control bit is located such that it can be serially loaded along with the other bits. A particularly useful embodiment is to use the mode control bit to configure the register as either a test pattern generator or a signature analysis register in support of integrated circuit self-test functions.

15 Claims, 3 Drawing Sheets

RECONFIGURABLE REGISTER

RECONFIGURABLE REGISTER

REGISTER CONTROL LOGIC

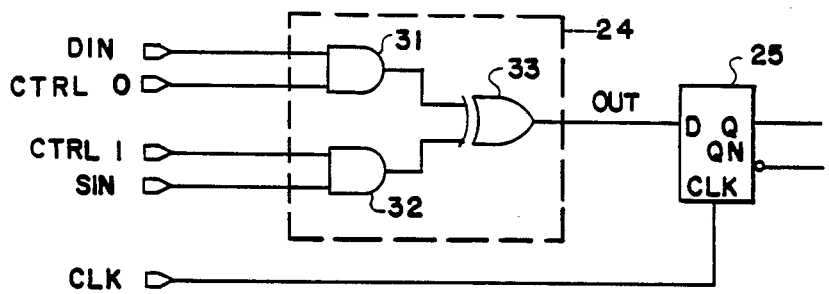
Fig 3    RECONFIGURABLE BIT-SLICE
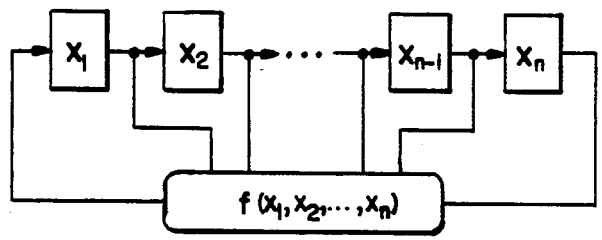
Fig 4    FEEDBACK SHIFT REGISTER
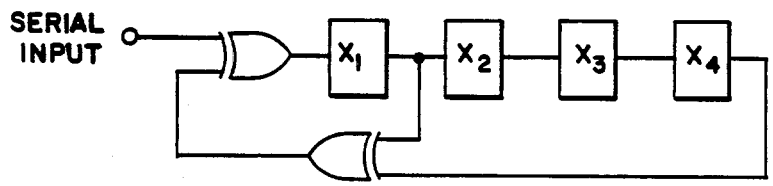
Fig 5    SERIAL INPUT SIGNAL ANALYSIS REGISTER
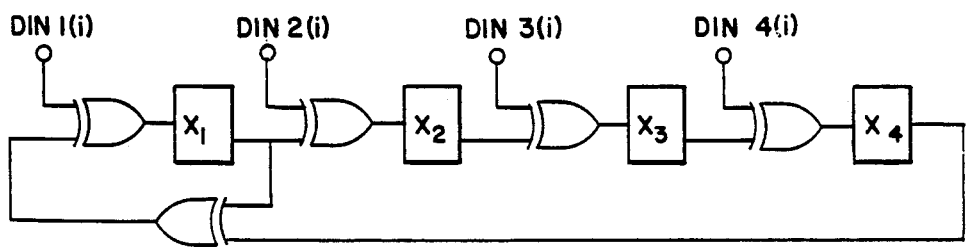
Fig 6    PARALLEL SIGNATURE ANALYSIS REGISTER

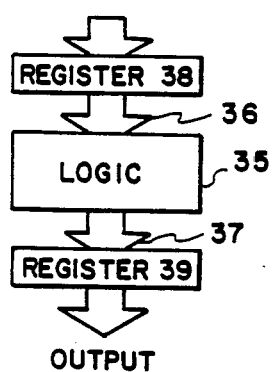
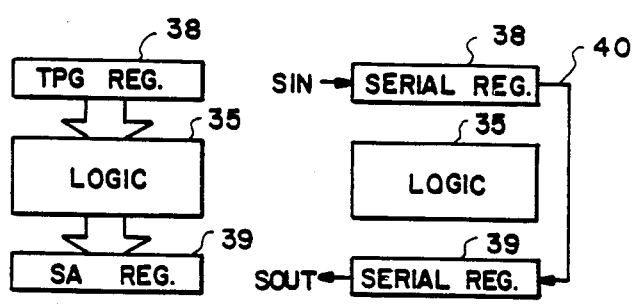
Fig 7a  Fig 7b  Fig 7c
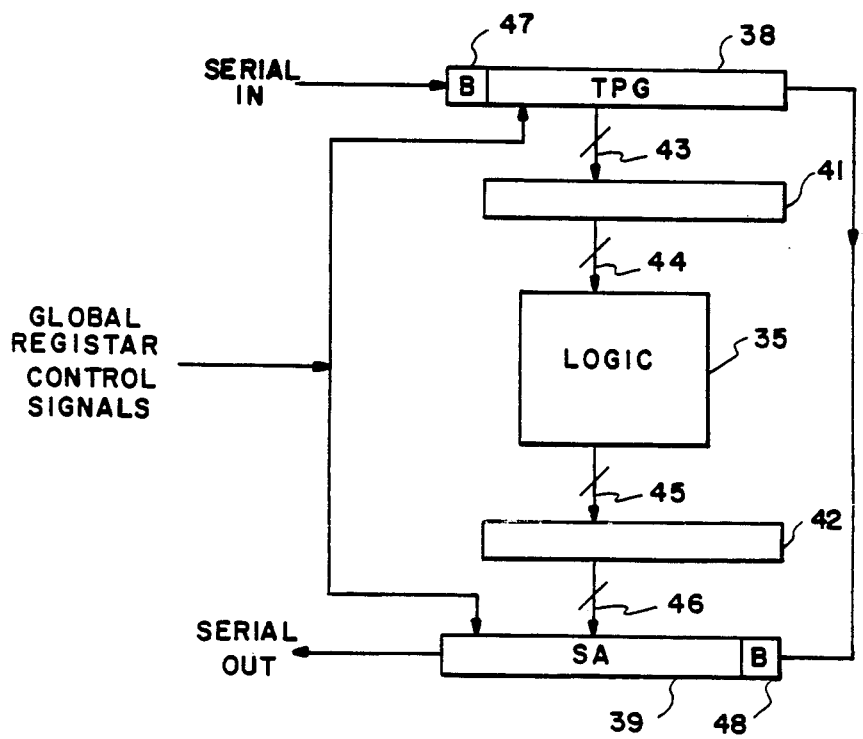
Fig. 8

DIGITAL REGISTERS WITH SERIAL ACCESSED MODE CONTROL BIT

The Government has rights in this invention pursuant to Contract No. F33615-84-C-1500, awarded by the Department of the Air Force.

BACKGROUND OF THE INVENTION

1. Field of the Invention.

This invention relates to reconfigurable registers where a control bit determines the register's mode. In particular, this invention relates to the use of such registers in integrated circuit self-test applications.

2. RELATED ART

Reconfigurable registers are typically digital shift registers wherein control signals select among several possible configurations. For example, the register may be configured to serially shift data, support a normal functional operation or reset. Control logic associated with one or more reconfigurable registers is often used to decode the mode select signals. Control bits are used to encode the mode select signals and control lines couple these control bits to the various reconfigurable registers. Typically, the control bits are located on the periphery of a chip with extended control lines added primarily to couple the control bit to the proper register.

As monolithic integrated circuit chips become more complex, efficient chip topography becomes imperative, and a reduction in control lines, particularly extended control lines, is highly desirable.

Heretofore no reconfigurable register has been available which significantly reduces the register's dependence on such control lines. Furthermore, with the increase in chip complexity, self-test features are increasingly in demand, and reconfigurable registers play a central roll in many self-test schemes. Thus, reconfigurable registers which enhance chip topography also advance self-test design.

SUMMARY OF THE INVENTION

The present invention is a reconfigurable digital register which can be serially loaded. An additional bit (the control bit) indicative of one of two register modes is associated with the register and located such that the additional bit can be serially accessed along with the other bits of the register.

The present invention is particularly useful in integrated circuit self-test applications. One important arrangement is the configuration of a first register as a test pattern generator and a second register as a signal analysis register. The test pattern generator applies test patterns to at least part of the input of a logic block and the signal analysis register compacts the responses of the logic block to the test patterns. The control bit of each of the test pattern generator and the signal analysis register is serially loaded with the appropriate value when the registers are initialized.

BRIEF DESCRIPTION OF THE DRAWINGS

FIG. 3 is a more detailed diagram of the bit slices in FIG. 1.

FIG. 4 is a generalized representation of a feedback shift register.

FIG. 5 is a representation of a four bit linear feedback shift register reconfigured to perform serial signature analysis.

FIG. 6 is a representation of a four bit linear feedback register reconfigured to perform parallel signature analysis.

FIGS. 7a, b, and c depict various modes, respectively, of a self-test system employing the register of FIG. 1.

FIG. 8 depicts two reconfigurable registers in accordance with the present invention in combination with a logic block to be tested.

DESCRIPTION OF THE PREFERRED EMBODIMENT

Figure 1:
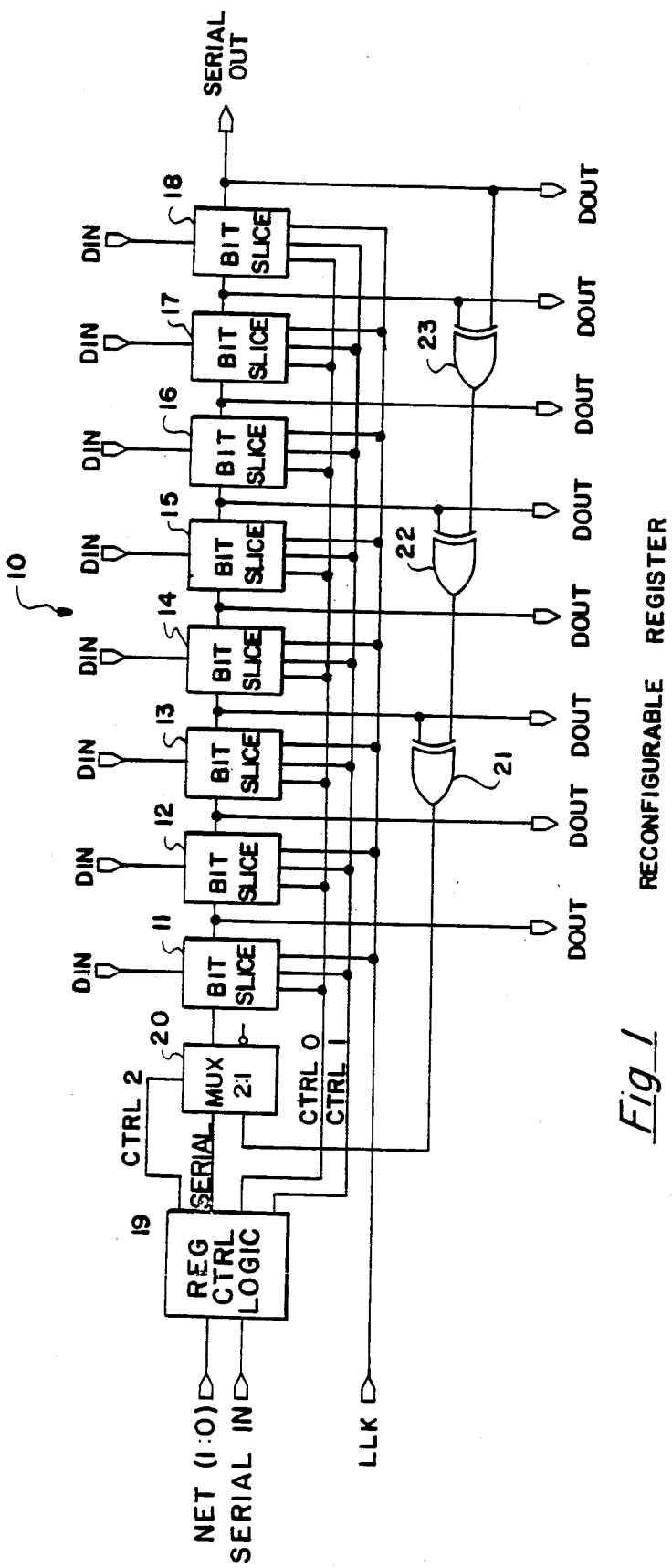
FIG. 1 is a block diagram of a reconfigurable register in accordance with the present invention.

Reconfigurable register 10 of FIG. 1 depicts a particularly useful example of the present invention. Eight bit slices 11, 12, 13, 14, 15, 16, 17, and 18 are connected as a shift register. Register control logic 19 decodes mode select signals. Multiplexer 20 employs a control signal (CTRL 2) to transmit input data from the SERIAL line and/or feedback signals to support the self test modes (described below) to the bit slices.

Figure 2:
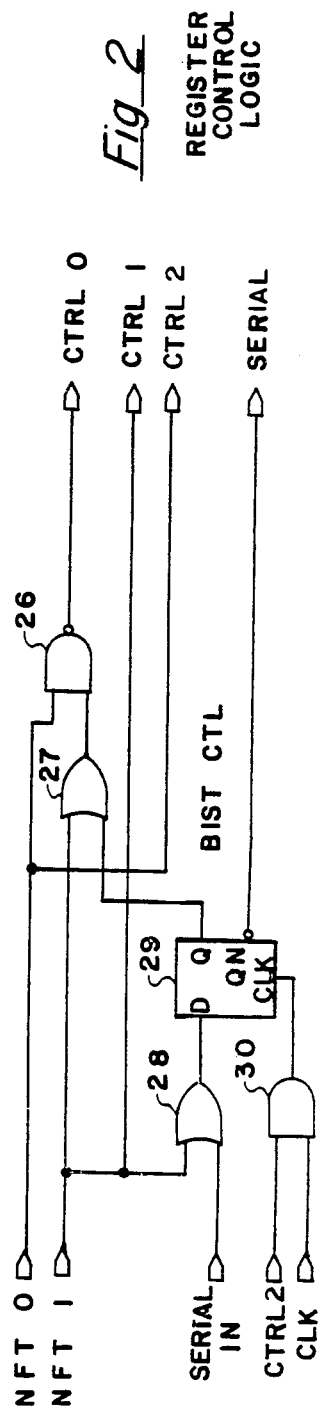
FIG. 2 is a detailed diagram of the register control logic of FIG. 1.

An example of register control logic circuit 19 is shown in FIG. 2. Therein two mode select bits NFT0 and NFT1 serve as inputs respectively to NAND gate 26 and OR gate 27. NFT1 is also an input to OR gate 28 as is the serial data SERIAL IN. Flip flop 29 holds a self-test bit labelled BIST CTL (i.e. built-in self-test control). One of the outputs (CTRL2) of the register control logic is input to AND gate 30 along with the clock signal CLK.

As shown in the example of FIG. 3, each bit slice includes decode logic 24 in addition to a means for retaining binary data such as flip flop 25. Decode logic 24 includes two dual input AND gates 31 and 32. Gate 31 receives a data signal DIN and one of the output control signals (CTRL0) from register control logic circuit 19. Gate 32 receives another control signal (CTRL1) from circuit 19, as well as serial input data SIN from circuit 19 or a preceeding bit slice. The outputs from gates 31 and 32 serve as inputs to dual XOR gate 33. The output from gate 33 is applied to the data input of flip flop 25.

In operation, register 10 functions as a digital data register which can be operated in five different "modes". A mode of operation of a register controls the way in which the register's next state (i.e. contents) is determined. First, it can SCAN or serial shift data as in a typical clocked shift register. Second, it can be RESET (or PRESET) to a preselected state. Third, it can be in its NORMAL FUNCTION mode, e.g. readable or capable of being written into. Fourth, and fifth, it can be in SELFTEST mode, with the BIST CTL bit determining whether it will function as a test pattern generator (TPG) or as a signal analysis (SA) register.

The truth table for the logic of FIG. 3 is shown below in table 1.

TABLE 1

| NFT (1:0) | BIST BIT | MODE | CTRL (2:0) |
|---|---|---|---|
| 00 | X | SCAN | 001 |
| 01 | 0 | SELF-TEST, TPG | 101 |
| 01 | 1 | SELF-TEST, SA | 100 |
| 10 | X | RESET (PRESET) | 011 |
| 11 | X | NORMAL | 110 |

TABLE 1-continued

| NFT (1:0) | BIST BIT | MODE | CTRL (2:0) |
|---|---|---|---|
| | | FUNCTIONAL | |

X = DON'T CARE

The TPG mode is facilitated by the linear feedback design of register 10. Linear feedback shift registers (LFSR) are known as devices which can automatically and sequentially generate a periodic succession of distinct digital data patterns. More generally, feedback shift registers can be represented as shown in FIG. 4. The blocks in FIG. 4 represent bits. If the feedback function $f(X_1, X_{22} \ldots, X_n)$ can be expressed in the form $$f(X_1, X_2, \ldots X_n) = C_1X_1 \oplus C_2X_2 \oplus C_3XC_3 \oplus \ldots C_nX_n$$

where each of the constants $C_i$ is either 0 or 1 and where the symbol $\oplus$ denotes addition modulo 2 (that is, 1 for odd sums and 0 for even sums), then the shift register of FIG. 4 is defined as "linear".

A "maximum" LFSR will generate $2^n-1$ distinct patterns of n bits for an n bit register. Maximum length is generally achieved by proper selection of data bits to be used in a modulo 2 sum feedback network. This selection process is described by W. W. Peterson and E. J. Weldon in *Error Correcting Codes*, second edition, MIT Press, 1972, Appendix C, pps. 472-492, the same being incorporated herein by reference.

Since the maximum-length LFSR can generate $2^n-1$ of the $2^n$ possible register states, one can see that a maximum length LFSR can be useful in providing extensive testing of logic circuits. In many cases the set of patterns necessary to completely test a circuit for specific faults (e.g. single stuck- at faults)are a subset of the $2^n-1$ register states possible in a maximum-length LFSR.

The use of LFSR in logic tests has a number of advantages over other possible sources of logic block input stimulus. The first is that the LFSR is extremely easy to construct and it takes relatively few gates to form a LFSR (whereas about thirty gates are required to form a counter).

In addition, the sequence of test patterns from an LFSR appear somewhat random (i.e. psuedo-random). These psuedo-random patterns generally provide better fault coverage with a subset run of test patterns than would an equivalent-length set generated by a counter. In a counter, the least significant bit toggles frequently, while the most significant bit toggles infrequently. A large number of test patterns are therefore required to test the logic driven by the most significant bits of a counter. In the case of an LFSR, however, all bits within the register toggle an equal number of times, and the logic driven by any set of LFSR bits is tested at about an equal rate. Thus, in cases where it is impractical and unecessary to use a full psuedo-exhaustive test, a smaller set of psuedo-random patterns can be used to provide acceptable fault coverage.

Any finite-state machine, including LFSRs and counters, may be used as a test pattern generation device with the present invention.

The other self-test mode, signal analysis or SA, described in the above example, can also conveniently utilize a LFSR. If an LFSR 34 is reconfigured to permit serial input as shown in FIG. 5, it can be used to encode test results as a serial signature analysis register. In the example of FIG. 5, as one bit inputs are sequentially clocked into the LFSR, the four bit state of the register changes. After j clock cycles, the response of the logic block to j test patterns has been clocked into the LFSR, one can compare the four bit state of the register to the four bit state which should have resulted if the logic block had functioned properly. If the results do not match, one knows that the logic block is faulty. If they match, the probability that the logic block is error free is a function of the number of bits serial fed to the register, and is approximately $\frac{1}{2}^n$ for a large number of bits fed into an n-bit signature analysis register.

If one wishes to record the results of multiple output signals, an XOR tree (not shown) can be used to compress the parallel results and then pass them to a serial SA register. Alternatively, the output data can be fed into the state of the LFSR at each bit (see FIG. 6). The output is applied j times for j test patterns with the final state of the register inspected to see if it conforms to the expected result. This later approach is called parallel signature analysis.

Both serial SA and parallel SA are methods of "compacting" the logic block output data so that information on the absence of an error in the logic block output data is retained in a smaller set of data (i.e., a signature). Either method, as well as other data-compaction methods, can be used with the present invention. FIG. 1 is designed for parallel signature analysis as described in FIG. 6.

Other forms of register control logic 19 and bit slice decode logic 24 than those shown in FIGS. 2 and 3 are, of course, possible. But the logic associated with register 10 must function to select among the register modes (including appropriate access of mode flip flop 29).

Flip flop 29 is just one example of a means for retaining a binary signal indicative of a register mode. Other devices performing the same or similar function can be employed. The invention requires that means such as flip flop 29 be located so that it can be at least selectively serially loaded along with the other bits of the register it is associated with. Typically, as shown in FIGS. 1 and 2, this will be achieved by placing flip flop 29 proximate to and in the serial access path of the other register bit slices. Flip flop 29 may however be remote from the other register bit slices, but it still must be included in a serial data path that allows it to be serially loaded along with the other register bit slices.

FIGS. 7a, b and c depict a particularly useful sequence of operations which employ the capabilities of the present invention.

In FIG. 7a a logic block 35 has an input 36 and an output 37. Two reconfigurable registers 38 and 39 in accordance with the present invention are configured to, respectively, apply data to and receive data from logic block 35 in the NORMAL FUNCTION mode. FIG. 7a depicts the parallel input of data into logic block 35 but the input could be serial. Similarly, register 38 is depicted as receiving data in parallel but it could receive data serially.

Logic block 35 can contain combinational logic, sequential logic or both. Logic block 35 processes or responds to the data applied to input 36 and a corresponding output (which may or may not change in response to the input) is available at output 37. The output is applied to register 39.

In FIG. 7b, the SELF TEST mode is selected for both of registers 38 and 39. The appropriate BIST CTL bit (i.e. flip flop 29) has been previously serially loaded into each register's control logic 19, and in the SELF TEST mode the BIST CTL bit is decoded. Register 38 is configured as a TPG and register 39 is configured as a SA register (preferably parallel SA).

Register 38 steps through its sequence of test patterns (typically by clocking registers 38 and 39 a number of times equal to the number of different test patterns generated by TPG 38) and the output of logic block 35 is compacted into register 39.

The contents of register 39 can be inspected without unloading the register to determine if the appropriate signature is present, or the data in register 39 can be unloaded (in parallel or serially) and inspected or compared elsewhere.

In order to unload or clear registers 38 and 39, they are again reconfigured. As shown in FIG. 7c, registers 38 and 39 are placed in SCAN mode, and the data in both registers is clocked out serially. Although register 38 and 39 could be unloaded in parallel, serial unloading using a single serial path is convenient. FIG. 7c includes a serial data path 40 which parallels the path of the test patterns and ties the serial output of register 38 to the serial input of register 39.

Typically serial input paths (such as SERIAL IN in FIG. 1) and serial output paths (such as path 40 in FIG. 7c) are provided to registers 38 and 39 to support functions other than self-test. As seen above, the present invention makes efficient use of such paths by including self test bits (e.g. BIST CTL) in the path. No additional routing lines dedicated to or primarily used for self-test bits are needed. Chip topography is simplified and the design of high density, self-test integrated circuits is enhanced.

FIG. 8 shows an expanded view of one form of the system of FIGS. 7a, 7b and 7c. In FIG. 8, logic block 35 is buffered from reconfigurable registers 38 and 39 by a logic input register 41 and a logic output register 42, respectively. Registers 41 and 42 are examples of intermediate structures which may be inserted in the data or signal path between the reconfigurable registers and the logic under test 35. The data or signal paths 43, 44, 45 and 46 between the various registers and logic 35 may transmit one or more bits (i.e. they may be serial or parallel paths). The additional mode control bits 47 and 48 in registers 38 and 39 are labelled with a B. The "global register control signals" are, for example, control signals such as NFT0, NFT1 and a clock signal to block 35, registers 38 and 39, and other chip components.

FIG. 8 demonstrates that reconfigurable registers 38 and 39 need not be directly tied to the input or output of a logic block. Intermediate registers are one example of possible interface devices. Such intermediate registers could serve a multiplexing function making the test register 38 "visable" to logic 35 only during the test mode, with a separate data path (not shown) to intermediate register 41 that by-passes register 38 for other modes of operation. Note that the "logic" can be defined as block 35 alone, or can include interface registers 41 and 42. Of course the logic can be sequential and/or combinational.

The present invention has been primarily described in terms of its use in self-test integrated circuit design. However, reconfigurable register 10 is useful anywhere multi-mode registers are desired and serial load paths are provided to such registers.

What is claimed is:

1. A reconfigurable digital register, comprising:
    a plurality of means for retaining an electrical signal indicative of either a first or a second state;
    means for serially loading said plurality of means for retaining an electrical signal in response to a first control signal, so that said state is set for each of said plurality of means for retaining an electrical signal; and
    an additional means for retaining an electrical signal indicative of either a first or a second state, wherein said additional means for retaining an electrical signal is capable of being serially loaded along with said plurality of means for retaining an electrical signal, and wherein said state of said additional means for retaining an electrical signal is indicative of two different modes of operation of said register.

2. The register of claim 1 wherein said additional means for retaining an electrical signal is proximate one of said plurality of means for retaining an electrical signal.

3. The register of claim 1 further including means for serially unloading said register in response to a second control signal.

4. The register of claim 1 further including means for selectively placing said register in one of said two different modes of operation in response to a second control signal, wherein the state of said additional means for retaining an electrical signal is part of said second control signal and wherein said means for selectively placing said register in one of said two different modes of operation includes one or more access lines for transmitting said second control signal to said plurality of means for retaining an electrical signal.

5. The register of claim 4 further including means for automatically and sequentially generating a plurality of test patterns when said additional means for retaining an electrical signal is in said first state, said generating being in response to said second control signal and wherein said means for automatically and sequentially generating a plurality of test patterns includes test pattern logic means connected to at least one of said plurality of means for retaining an electrical signal.

6. The register of claim 5 further including means for compacting digital data input to said register from a digital logic circuit when said additional means for retaining an electrical signal is in said second state, said compacting being in response to said second control signal.

7. An electronic apparatus for selectively configuring one or more digital registers to facilitate the testing of the response of a digital logic circuit to a plurality of digital test patterns, said digital logic circuit having an input and an output, said apparatus comprising:
    first digital register including a first set of bits;
    means for serially loading said first set of bits in response to a first control signal; and
    means for configuring said first digital register to automatically and sequentially generate said digital test patterns and apply, directly or indirectly, said test patterns individually to at least part of said digital logic circuit input, wherein said means for configuring said first digital register includes access lines to said first set of bits and an additional bit, wherein the state of said additional bit can be set so that when a second control signal is applied to said access lines to said first set of bits, the state of said additional bit will be determined and said test patterns will be generated, and wherein said means for configuring said first digital register also includes means for serially loading said additional bit along with said first set of bits.

8. The device of claim 7 wherein said first digital register includes also means for selectively serially unloading said first digital register.

9. The apparatus of claim 7 further including:
second digital register including a second set of bits;
means for serially loading said second set of bits in response to a third control signal; and
means for configuring said second digital register to sequentially receive, directly or indirectly, a plurality of at least a portion of the outputs of said logic block, wherein said outputs result from the input of said test patterns to said logic block, wherein said means for configuring said second digital register includes access lines to said second set of bits and a further bit, wherein the state of said further bit can be set so that when a fourth control signal is applied to said access lines to said second set of bits, the state of said further bit will be determined and receipt of said outputs will be enabled, and wherein said means for configuring said second digital register further includes means for serially loading said further bit along with said second set of bits.

10. The apparatus of claim 9 wherein said second digital register also includes means for selectively serially unloading said register.

11. The apparatus of claim 9 wherein said second digital register also includes means for selectively compacting said outputs.

12. The apparatus of claim 9 further including:
a serial data path leading into said first digital register, continuing from said first digital register to said second digital register and including at least part of each of said means for configuring said first digital register and said means for configuring said second digital register, and wherein data passing along that portion of said serial data path between said first and said second digital registers does not follow the same route as said test patterns.

13. A reconfigurable digital register, comprising:
a plurality of means for retaining an electrical signal indicative of either a first or a second state, said plurality of means for retaining an electrical signal being arranged in an order along a path, wherein each of said plurality of means for retaining an electrical signal can be independently set in either of said first or said second states;
a serial input to said plurality of means for retaining an electrical signal;
means for sequentially setting each of said plurality of means for retaining an electrical signal in either said first or said second state in response to state signals input at said serial input, wherein said state of each of said means for retaining an electrical signal are set in reverse of said order and said state signal for a particular of said means for retaining an electrical signal must first pass through all of said plurality of means for retaining an electrical signal which are on said path and between said serial input and said particular of said means for retaining an electrical signal; and
an additional means for retaining an electrical signal indicative of either a first or a second state, wherein said state of said additional means for retaining an electrical signal can be set as part of said sequence of setting said state in each of said plurality of means for retaining an electrical signal, and wherein said state of said additional means for retaining an electrical signal is also indicative of two different operational modes of said register.

14. The digital register of claim 13 wherein one of said modes is the automatic and sequential generation of a plurality of digital data test patterns.

15. The digital register of claim 14 wherein the other of said modes is the compaction of a plurality of inputs.

* * * * *